United States Patent
Nakamura et al.

(10) Patent No.: US 6,368,663 B1
(45) Date of Patent: Apr. 9, 2002

(54) CERAMIC-BASED COMPOSITE MEMBER AND ITS MANUFACTURING METHOD

(75) Inventors: Takeshi Nakamura, Tokorozawa; Hiroshige Murata, Funabashi; Shoju Masaki, Tachikawa, all of (JP)

(73) Assignee: Ishikawajima-Harima Heavy Industries Co., Ltd, Tokyo (JP)

( * ) Notice: Subject to any disclaimer, the term of this patent is extended or adjusted under 35 U.S.C. 154(b) by 0 days.

(21) Appl. No.: 09/340,663

(22) Filed: Jun. 29, 1999

(30) Foreign Application Priority Data

Jan. 28, 1999 (JP) .......................... 11-019416

(51) Int. Cl.$^7$ ...................... C23C 16/26; B29C 47/00; B28B 3/00
(52) U.S. Cl. .................... 427/248.1; 427/228; 427/249; 427/294; 427/333; 427/419.2; 427/432; 156/155; 156/245; 264/625; 264/640; 264/641; 264/642; 264/643; 425/378; 425/408
(58) Field of Search ............................. 442/63, 64, 136

(56) References Cited

U.S. PATENT DOCUMENTS

| | | |
|---|---|---|
| 3,716,610 A | 2/1973 | Goldstein |
| 4,100,233 A | 7/1978 | Yajima et al. |
| 4,120,731 A | 10/1978 | Hillig et al. |
| 4,238,433 A | 12/1980 | Hillig et al. |
| 4,580,524 A | 4/1986 | Lackey, Jr. et al. |
| 4,642,271 A | 2/1987 | Rice |
| 4,752,503 A | 6/1988 | Thebault |
| 4,935,387 A | 6/1990 | Beall et al. |
| 5,000,386 A | 3/1991 | Lybarger |
| 5,074,749 A | 12/1991 | Fouillot |
| 5,079,039 A | 1/1992 | Heraud et al. |
| 5,134,020 A | 7/1992 | Cotteret et al. |
| 5,196,235 A | 3/1993 | Parlier et al. |
| 5,221,578 A | 6/1993 | Carpenter et al. |
| 5,350,545 A | 9/1994 | Streckert et al. |
| 5,459,114 A | 10/1995 | Kaya et al. |
| 5,490,892 A * | 2/1996 | Castagnos et al. ............ 156/89 |
| 5,491,973 A | 2/1996 | Knapp et al. |
| 5,514,474 A | 5/1996 | Morgan et al. |
| 5,552,220 A | 9/1996 | Goujard et al. |
| 5,630,700 A | 5/1997 | Olsen et al. |
| 5,733,655 A | 3/1998 | Bors et al. |
| 5,853,653 A * | 12/1998 | Donato et al. .............. 264/625 |
| 5,865,922 A | 2/1999 | Behrendt et al. |
| 5,879,803 A | 3/1999 | Masaki et al. |

FOREIGN PATENT DOCUMENTS

| | | |
|---|---|---|
| EP | 0 172 082 A | 2/1986 |
| EP | 0 799 809 A | 10/1997 |
| JP | 63-12671 | 1/1988 |
| WO | WO94/15887 A | 7/1994 |

* cited by examiner

Primary Examiner—Cheryl A. Juska
Assistant Examiner—Alexis Wachtel
(74) Attorney, Agent, or Firm—Griffin & Szipl, P.C.

(57) ABSTRACT

There is disclosed a hybrid treatment into which CVI treatment and PIP treatment are combined. A dense matrix is formed around a ceramic fiber by the CVI treatment, and a gap in the matrix is infiltrated/filled well with the matrix by the PIP treatment, so that hermetic properties are enhanced. Moreover, when a volume ratio of the matrix by the CVI treatment in the total matrix is set to about 5% or more, about 80% or less, fine cracks are present in the matrix by the PIP treatment, so that a binding force of the ceramic fiber is weakened, and Young's modulus can be reduced. As a result, a thermal stress is alleviated and a resistance to thermal shock is enhanced.

5 Claims, 6 Drawing Sheets

FIG.4 TENSILE STRENGTH OF HYBRID MATRIX

CERAMIC-BASED COMPOSITE MEMBER AND ITS MANUFACTURING METHOD

BACKGROUND OF THE INVENTION (i) Technical Field of the Invention

The present invention relates to a ceramic-based composite member superior in hermetic properties and resistance to thermal shock and its manufacturing method.

(ii) Description of the Related Art

In order to raise performance of a rocket engine using $NTO/N_2H_4$, NTO/MMH, and the like as impelling agents, heat-resistant temperature of a combustor (thrust chamber) is requested to be raised. For this purpose, a coated niobium alloy having a heat-resistant temperature of about 1500° C. has been heretofore used as a chamber material for many rocket engines. However, this material is disadvantageously heavy because of its high density, low in high-temperature strength, and has a short coating life.

On the other hand, since ceramic is high in heat resisting properties but disadvantageously brittle, a ceramic matrix composite member (hereinafter abbreviated as CMC) has been developed by reinforcing the ceramic with ceramic fiber. Specifically, a ceramic-based composite member (CMC) comprises ceramic fiber and ceramic matrix. Additionally, in general the CMC is indicated as ceramic fiber/ceramic matrix by its material (e.g., when both are formed of SiC, SiC/SiC is indicated).

Since CMC is light-weight and high in high-temperature strength, it is a remarkably prospective material for the combustor (thrust chamber) of the rocket engine, further a fuel piping in a high-temperature section, a turbine vane of a jet engine, a combustor, an after-burner component, and the like.

However, the conventional CMC cannot hold its hermetic properties and is disadvantageously low in resistance to thermal shock and thermal cycles. Specifically, for the conventional CMC, after a predetermined shape is formed of ceramic fibers, a matrix is formed in a gap between the fibers in so-called CVI (Chemical Vapor Infiltration) treatment. However, what remains a problem is that it takes an impractically long time (e.g., one year or more) to completely fill the gap between the fibers by the CVI.

Moreover, in a high-temperature test or the like of the conventional CMC formed as described above, when a fierce thermal shock (e.g., temperature difference of 900° C. or more) acts, the strength is drastically lowered, and the CMC can hardly be reused.

Therefore, the conventional ceramic-based composite member (CMC) cannot substantially be used in the combustor (thrust chamber), the fuel piping or another component requiring the hermetic properties and resistance to thermal shock.

SUMMARY OF THE INVENTION

The present invention has been developed to solve the aforementioned problems. Specifically, an object of the present invention is to provide a ceramic-based composite member and its manufacturing method which can largely enhance hermetic properties and resistance to thermal shock and which can be for practical use in a thrust chamber and the like.

According to the present invention, there is provided a ceramic-based composite member comprising a dense matrix formed on a surface of a shaped fabric, and a matrix having fine cracks formed in a gap of the matrix.

In the structure, since the binding force of the ceramic fiber by the matrix having fine cracks is weak, a kind of soft structure is formed, Young's modulus is lowered, the thermal stress is reduced, and the resistance to thermal shock is enhanced.

Moreover, according to the present invention, there is provided a method of manufacturing a ceramic-based composite member, in which after CVI treatment is performed to form an SiC matrix on a surface of a shaped fabric, PIP treatment is performed to infiltrate a gap of the dense matrix with an organic silicon polymer as a base before performing pyrolysis.

The method of the present invention is a process (hereinafter referred to as the hybrid treatment) constituted by combining CVI and PIP treatments, a dense matrix is formed around a ceramic fiber by CVI treatment, and the gap is infiltrated/filled with the matrix by the PIP treatment. Additionally, the matrix formed by the hybrid treatment is called the hybrid matrix.

The PIP (Polymer Impregnation and Pyrolysis) treatment has a faster matrix forming rate as compared with CVI treatment, and can repeatedly be performed in a short time. Therefore, by repeating the PIP treatment, the gap after the CVI treatment is filled well, and the hermetic properties can be enhanced.

Moreover, since fine cracks are present in the matrix by PIP treatment, a binding force of the ceramic fiber is weak. Therefore, when the PIP treatment is applied in addition to the CVI treatment, Young's modulus can be reduced as compared with the conventional CMC only by CVI treatment, and, as a result, it has been confirmed by experiments that a thermal stress is alleviated and the resistance to thermal shock is remarkably improved.

According to a preferred embodiment of the present invention, the above-mentioned PIP treatment is performed after a volume ratio of the CVI SiC matrix becomes about 5% or more and about 80% or less.

When the volume ratio is less than 5%, the dense matrices surrounding the ceramic fibers are lessened, and resistance to oxidation is deteriorated. Moreover, when 80% is exceeded, a decrease ratio of Young's modulus is small, and the resistance to thermal shock cannot sufficiently be enhanced. Therefore, when the volume ratio of the matrix by CVI treatment is set to about 5% or more, about 80% or less, Young's modulus can sufficiently be reduced and the resistance to thermal shock can remarkably be enhanced as compared with the conventional CMC only by CVI treatment.

Still other objects of the present invention, and the advantageous characteristics thereof, will become apparent from the following description with reference to the accompanying drawings.

DETAILED DESCRIPTION OF THE PREFERRED EMBODIMENTS

Preferred embodiments of the present invention will be described hereinafter with reference to the drawings.

Figure 1:
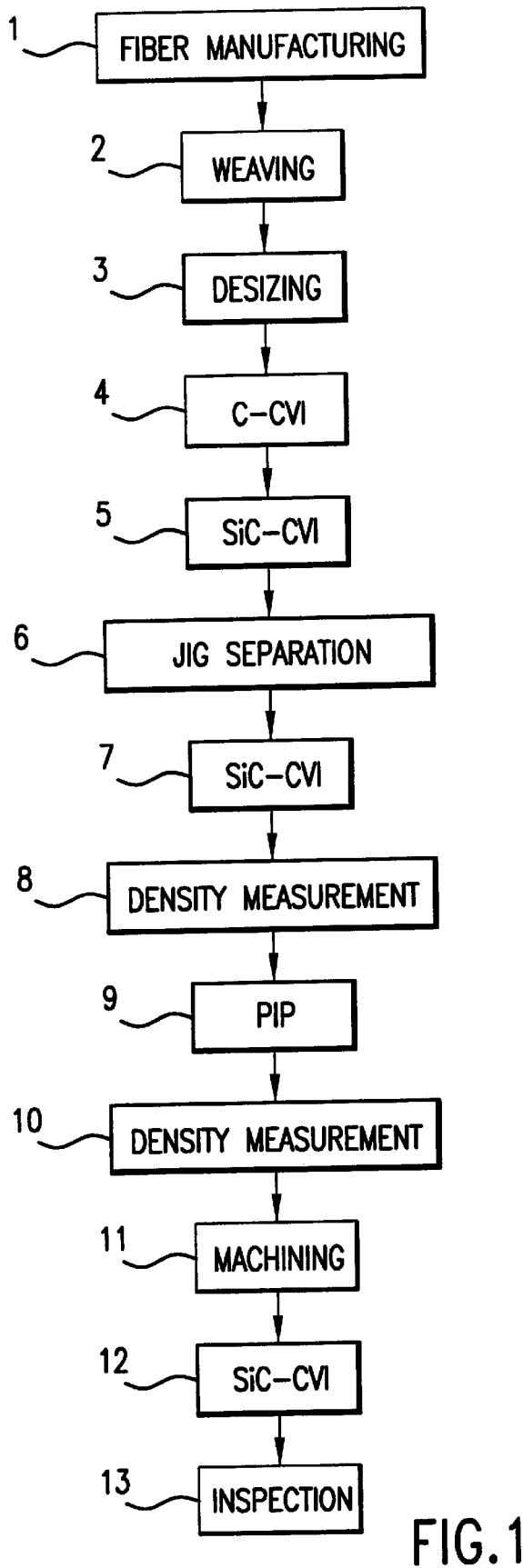
FIG. 1 is a flowchart showing a method of manufacturing a ceramic-based composite member of the present invention.

FIG. 1 is a flowchart showing a method of manufacturing a ceramic-based composite member of the present invention. As shown in FIG. 1, the method of the present invention is used as a part of each of processes: fiber manufacturing 1; weaving 2; desizing 3; C-CVI 4; SiC-CVI 5; jig separation 6; SiC-CVI 7; density measurement 8; PIP 9; density measurement 10; machining 11; SIC-CVI 12; and inspection 13. Additionally, the jig separation 6, SiC-CVI 7, and the like can be omitted.

In the fiber manufacturing process 1 and the weaving process 2, a fabric of a predetermined shape is formed using SiC fiber. The shape formed in the weaving process 2 may be a suitable shape for a combustor (thrust chamber) of an applied rocket engine, further a fuel piping of a high-temperature section, a turbine vane, a combustor, an afterburner component, and the like.

Moreover, in the desizing process 3, an excess polymer coating on the fiber is removed. In the machining process 11, a ceramic-based composite member (CMC) in the hybrid treatment as a combination of CVI and PIP treatments is machined and surface-ground to manufacture a desired component. In the process, a predetermined shape is formed using, for example, a diamond grinding wheel.

A main process of the present invention comprises the above-mentioned hybrid treatment, i.e., the CVI treatment for forming an SiC matrix on a surface of the shaped fabric in a reduced-pressure atmosphere, and the PIP treatment for infiltrating a gap in the formed matrix with an organic silicon polymer as a base and performing pyrolysis.

In the example of FIG. 1, the CVI treatment comprises the C-CVI process 4 and three SiC-CVI processes 5, 7 and 12. In the C-CVI process 4, the shaped fiber is coated with carbon (preferably graphite carbon), BN, or the like. Coating thickness is preferably about 0.1 to 1.0 μm. As disclosed in Japanese Patent Application Laid-open No. 12671/1988, the coating plays a role of separating the matrix and the ceramic fiber to reinforce fiber tenacity.

The SiC-CVI processes 5, 7, 12 are processes for performing treatment in so-called CVI (Chemical Vapor Infiltration) method, in which the fabric fixed with a dedicated jig in a furnace is heated and, for example, methyltrichlorosilane is flown in the reduced-pressure atmosphere to synthesize SiC. Additionally, the first two CVI processes 5 and 7 are repeated as required, so that the volume ratio of the matrix synthesized in the CVI treatment is set to about 5% or more and about 80% or less. The last CVI process 12 is a process for forming a dense matrix on a surface of the matrix formed in PIP treatment. Additionally, the process 12 is not essential, and may be omitted as the case may be.

The PIP process 9 comprises an infiltration process for infiltrating the gap of the matrix formed in CVI treatment with the organic silicon polymer as the base and the subsequent pyrolysis process. The infiltration and pyrolysis processes are repeated if necessary.

The organic silicon polymer for use in the infiltration process may be polycarbosilane solution, polyvinylsilane, polymethalocarbosilane, or the like, or a mixture thereof with SiC powder. The matrix in which fine cracks are present can be formed in a short time by the PIP treatment for performing infiltration and pyrolysis using the organic silicon polymer.

Moreover, the infiltration in the PIP treatment may comprise any one of dipping, reduced-pressure infiltration, and pressurizing infiltration, or a combination thereof. In the dipping, a large amount of organic silicon polymer can be infiltrated in a short time. Moreover, in the reduced-pressure infiltration, fine gaps can be infiltrated with the organic silicon polymer. Furthermore, in the pressurizing infiltration, hermetic properties can be enhanced by performing infiltration while pressurizing in a pressure direction at the time of use.

Furthermore, the ceramic-based composite member of the present invention comprises an SiC matrix formed on a surface of a shaped fabric, and a matrix having fine cracks formed in a gap of the matrix. The SiC matrix on the surface of the shaped fabric can be formed in the above-mentioned CVI treatment. Moreover, the matrix having fine cracks can be formed in the above-mentioned PIP treatment. Examples Examples of the present invention will be described hereinafter.

1. Method of manufacturing Chamber

An SiC/SiC chamber was manufactured by the manufacturing method shown in FIG. 1. Tyrrano Lox-X fiber manufactured by Ube Industries, Ltd. was used as SiC fiber for the chamber. The fiber was woven on a mandrel, and infiltrated with SiC matrix. Moreover, for the matrix infiltration, the hybrid treatment constituted by combining the CVI and PIP treatments was applied. After the infiltration, an inlet attachment region and a nozzle inner surface were machined.

2. Leak Test Method

Leak test was implemented at 0.7 MPa. After the chamber was submerged in water, and pressurized with $N_2$ gas, gas passed through the chamber was captured and measured as a leak amount. Moreover, a gap between the chamber inlet and a chamber throat was sealed, so that a nozzle section was prevented from being pressurized.

3. Pressure Test Method

Water was used as a pressurizing medium, and pressure test of the chamber was performed at 4.5 MPa. A sealing method was the same as in the leak test.

4. Combustion Test Method

Combustion test was implemented using a rocket test equipment to confirm heat resistance and oxidation resistance under combustion conditions, and $NTO/N_2H_4$ was used as an impelling agent. Moreover in the test, two types of jet film cooling ratios, 26% and 9% were tested.

5. Thermal Shock Test Method

Water quench test was performed to grasp thermal shock resistance. In the water quench test, a test piece heated to a high temperature is quenched in water as it is.

Two types of test pieces were prepared for comparison. One test piece was only of a conventional CVI matrix, and was a CMC of standard Nicalon/SiC manufactured by Du Pont. A lamination pattern was 0/90/±45°. The other test piece was a CMC by the hybrid treatment of the present invention into which the CVI and PIP treatments were combined. Its lamination pattern was 0/90°. After each test piece was held at 700° C. and 900° C. for one hour, and quenched in water, survival strength was measured. Table 1 shows comparison of material properties of the thermal shock test.

TABLE 1

Comparison of material properties of thermal shock test

| Manufacture | Matrix | Fiber | Lay up | Vf | Tensile Modulus |
|---|---|---|---|---|---|
| Du Pon't* | CVI | Nicalon 202 | 0/90/+−45 | 40% | 250 GPa |
| IHI | Hybrid | Tyrrano Lox M | 8 satin | 44% | 120 GPa |

6. Leak Test Result

There was a leak in the beginning of the matrix infiltration, but the leak turned to zero by repeating the PIP treatment.

7. Pressure Test Result

The test was conducted with a pressurizing profile in which pressure was held at 3 MPa for ten minutes and raised to maximum pressure of 4.5 MPa, but leak, deformation, or another damage was not detected. Specifically, it has been confirmed that the CMC (SiC/SiC chamber) by the hybrid treatment of the present invention has a sufficient strength.

8. Combustion Test Result

Figure 2:
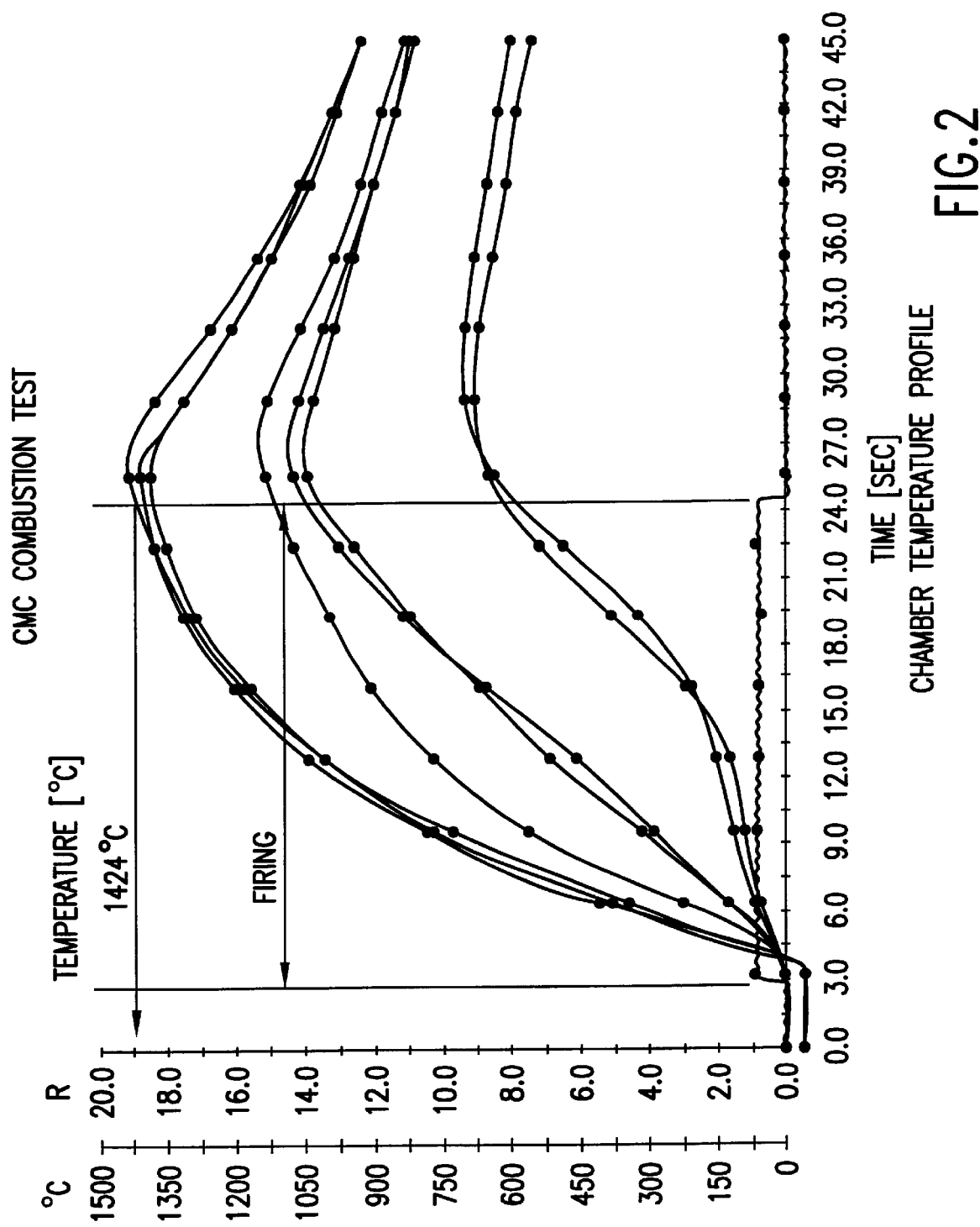
FIG. 2 is a graph showing changes of chamber temperature in an embodiment of the present invention.

FIG. 2 is a graph showing changes of chamber temperature in the embodiment of the present invention. The combustion test was implemented four times, and the maximum operation time was 22 seconds. Moreover, the maximum temperature of a chamber wall measured 1424° C. Additionally, the maximum temperature of an inner surface is estimated to be about 1800° C.

9. Thermal Shock Test Result

Figure 3:
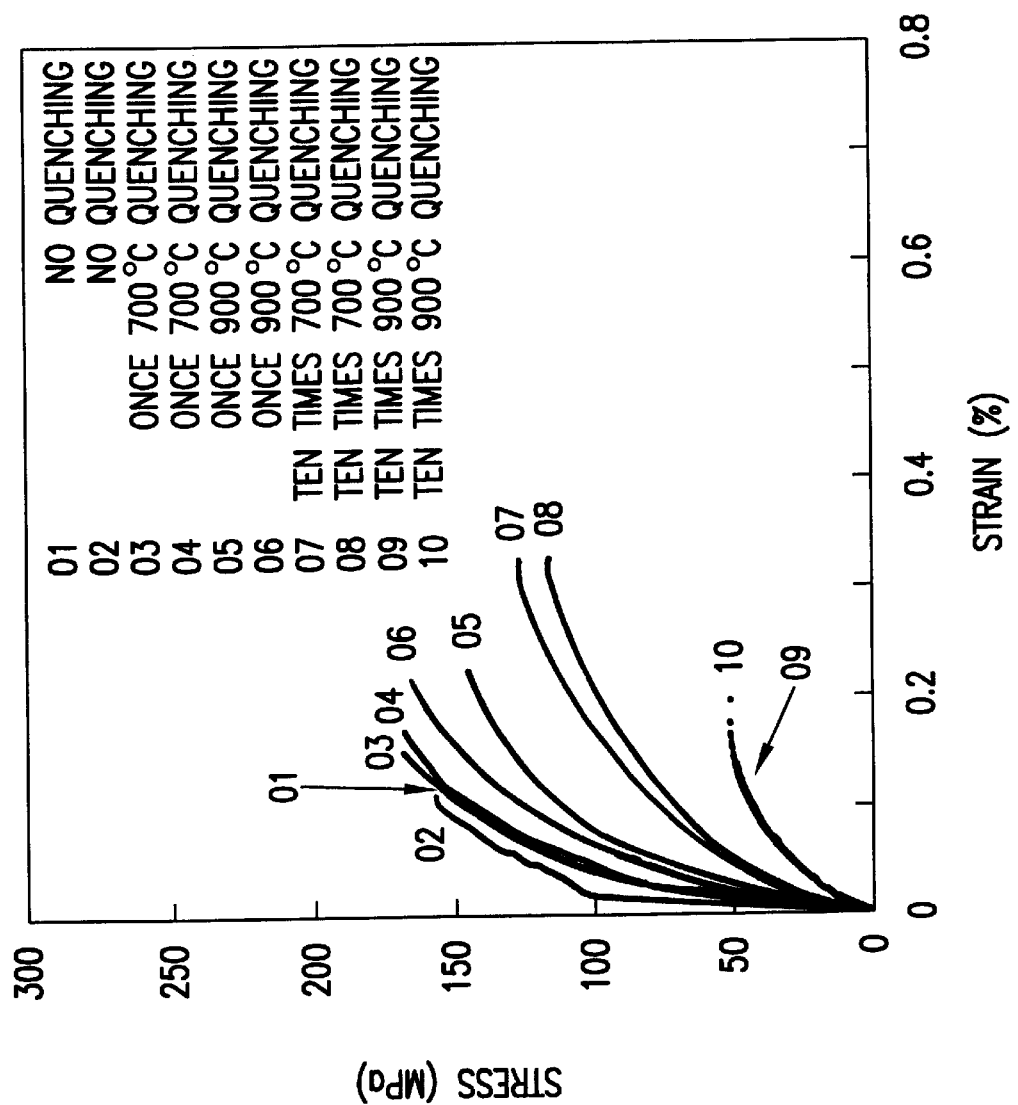
FIG. 3 is a graph showing a survival strength of CMC only by a conventional CVI treatment.
Figure 4:
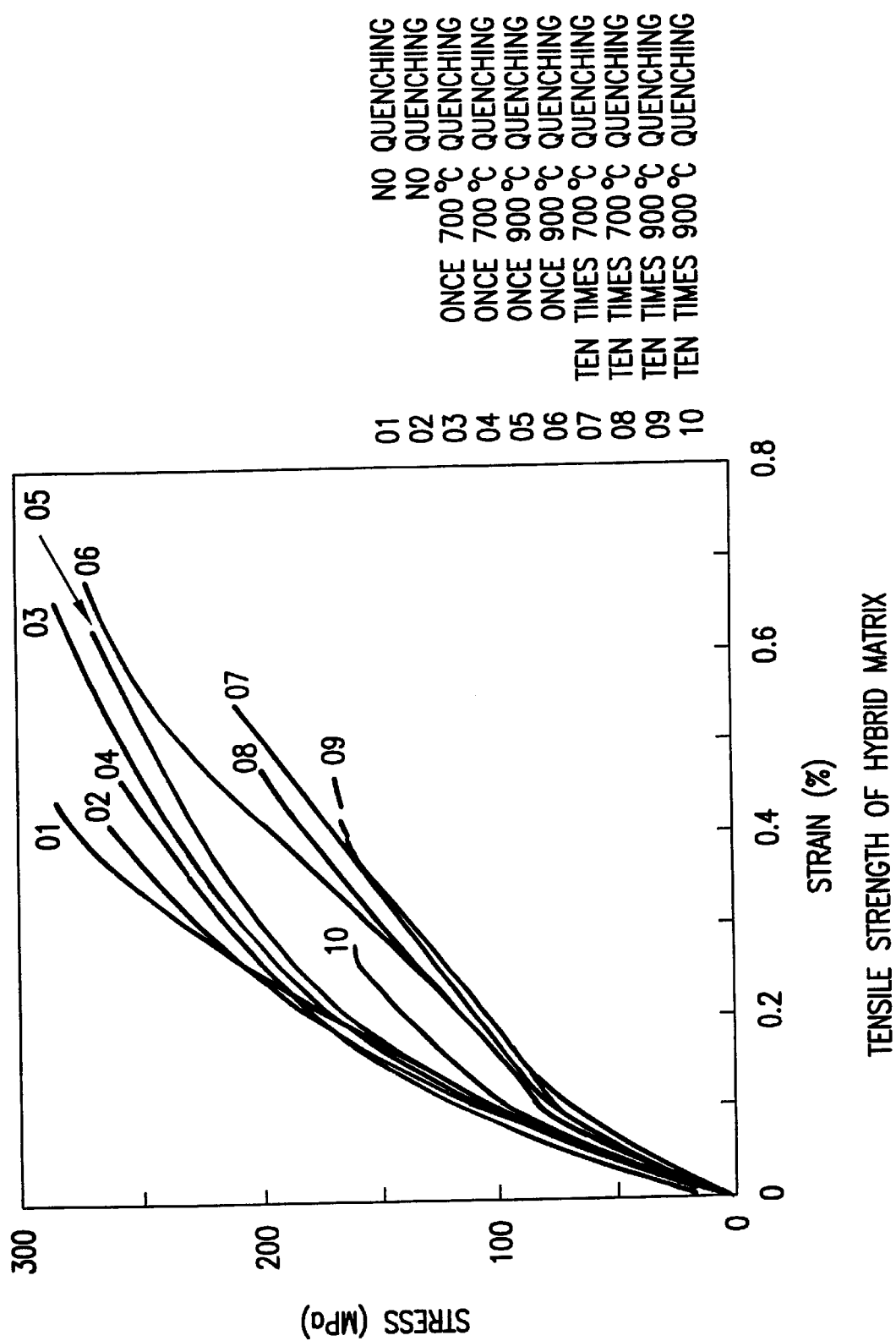
FIG. 4 is a graph showing a survival strength of CMC by a hybrid treatment of the present invention.

FIGS. 3 and 4 show survival strengths of CMC only by the conventional CVI treatment and CMC by the hybrid treatment of the present invention, respectively. In the drawings, 01, 02 indicate data prior to the water quench test, 03 to 06 indicate data after the water quench test was performed once, and 07 to 10 indicate data after the water quench test was performed ten times. Moreover, in the drawings, 03, 04, 07, 08 indicate the water quench test from 700° C., while 05, 06, 09, 10 indicate the water quench test from 900° C.

It is seen from FIGS. 3 and 4 that no apparent strength decrease occurred after the thermal shock test was performed once, but the survival strength was lowered at both 700° C. and 900° C. after the thermal shock test was performed ten times.

Moreover, as shown in FIG. 3, the survival strength of CMC (CVI matrix type) only by CVI treatment was about 80% after ten thermal shock tests from 700° C., and about 30% after ten thermal shock tests from 900° C. Therefore, in CVI matrix type, rapid strength decrease was caused by a temperature rise of 200° C.

On the other hand, as shown in FIG. 4, in CMC (hybrid matrix type) by the hybrid treatment, the survival strength was similarly about 80% after ten thermal shock tests from 700° C., but about 60% after ten thermal shock tests from 900° C. Therefore, it is seen that in the hybrid matrix type, the strength decrease was caused remarkably less by the temperature rise of 200° C. to 900° C. from 700° C. Consequently, when the matrix type and the hybrid type are compared, it can be said that the hybrid type is superior in thermal shock resistance.

10. Considerations for Thermal Shock Test

Biot modulus β is generally used to describe the degree of thermal shock. Biot modulus β is generally defined in equation 1. Here, h represents surface thermal conduction modulus, k represents thermal conductivity, and r represents half of a thickness of test piece. Moreover, in case of water cooling, h is about 4200 to 42000 W/(m²K), and Biot modulus β is estimated as shown in Table 2.

$$\beta = \frac{h \cdot r}{k} \quad [\text{Equation 1}]$$

TABLE 2

Blot Modulus and Parameters of Thermal Shock Test

| | Parameter Unit | h *10³ W/(m2 · k) | k W/(m · k) | r mm | β |
|---|---|---|---|---|---|
| Tensile Test | CVI matrix | 4.2–42 | 7 | 1.25 | 0.75–7.5 |
| | Hybrid | 4.2–42 | 5 | 1.25 | 1.05–10.5 |

The tensile strength is considered to be lowered by fiber breakage. When the strength decrease by thermal cycle is studied, the fiber breakage is considered to be continuously generated. A surface maximum tensile stress can be estimated in equation 2 using Biot modulus β. Here, E represents Young's modulus, α represents thermal expansion coefficient, ν represents Poisson's ratio, ΔT represents temperature difference (approximate water quench temperature), and σ* represents nondimensional stress.

$$\sigma\max = \frac{E\alpha}{1-\nu}\Delta T \cdot \sigma^* \quad [\text{Equation 2}]$$

$$\frac{1}{\sigma^*} = 1.5 + \frac{3.25}{\beta} - 0.5e^{-16/\beta}$$

Figure 5:
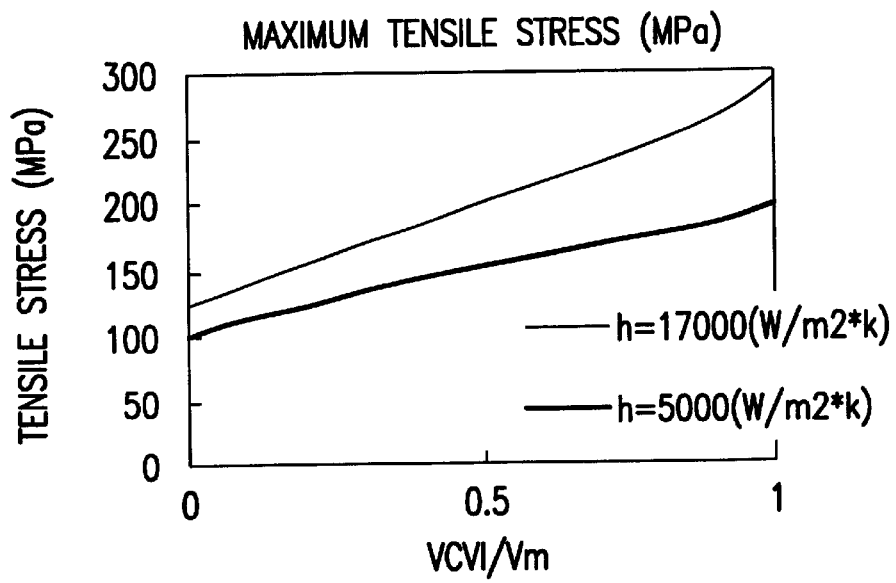
FIG. 5 is a graph showing a relationship between CVI matrix ratio in the total matrix and maximum tensile stress in CMC.

FIG. 5 is a graph showing a relationship between volume ratio (VCVl/Vm) and maximum tensile stress of CVI matrix in the matrix. In the drawing, an upper line indicates a case where h is 17000 W(m²K) while a lower line indicates a case where h is 5000 W(m²K).

It is seen from the equation 2 and FIG. 5 that the maximum tensile stress depends more on Young's modulus than on the thermal conductivity. From Table 2, CVI matrix has the thermal conductivity 1.4 times that of the hybrid matrix, but its Young's modulus is twice that of the hybrid matrix. Here, when the thermal conductivity is 17000, Poisson's ratio is 0.2, and the thermal expansion coefficient is 3×10⁻⁶, the maximum tensile stress of CVI type is about 300 MPa, while that of the hybrid type is only about 200 MPa. Such superiority coincides with the tensile test result.

Therefore, in view of the resistance to thermal shock, the hybrid type is superior because it can reduce the thermal stress (maximum tensile stress).

Figure 6:
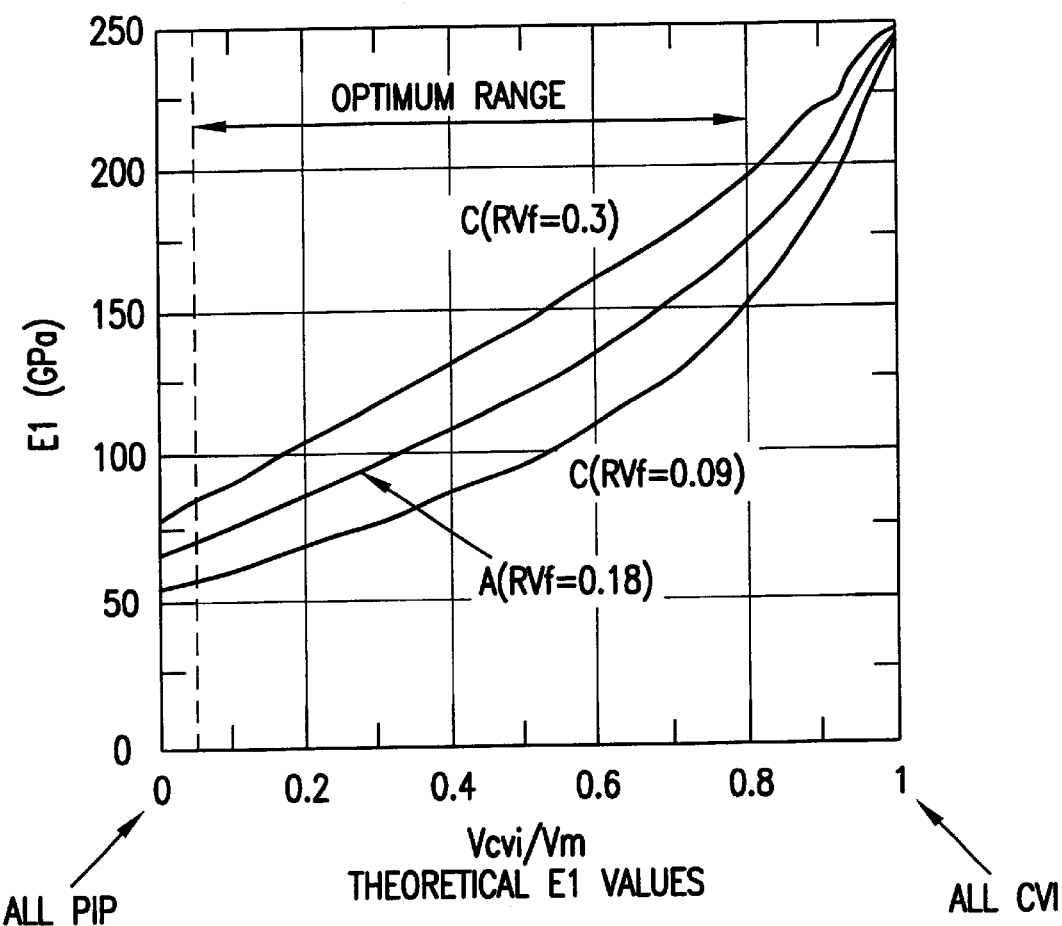
FIG. 6 is a graph showing a relationship between the CVI matrix ratio in the total matrix and Young's modulus of CMC.

FIG. 6 is a graph showing a relationship between the volume ratio of the matrix by CVI treatment in the total matrix and Young's modulus of CMC. In the drawing, abscissa represents the volume ratio of the matrix by CVI treatment, while the remaining part shows the matrix by PIP treatment. Moreover, ordinate represents Young's modulus of CMC.

As described above, in the method of the present invention the volume ratio of the matrix synthesized in CVI treatment is set to about 5% or more and about 80% or less. As is apparent from FIG. 6, when the volume ratio is set in the range, Young's modulus can be reduced to about 30% to 70%, as compared with the conventional CMC only by CVI treatment (abscissa 1.0). Additionally, when the volume ratio is less than 5%, dense matrices surrounding the ceramic fibers are diminished, and the oxidization resistance is lowered. Moreover, when 80% is exceeded, the decrease ratio of Young's modulus is small, and the resistance to thermal shock described later cannot be sufficiently raised.

Figure 7A:
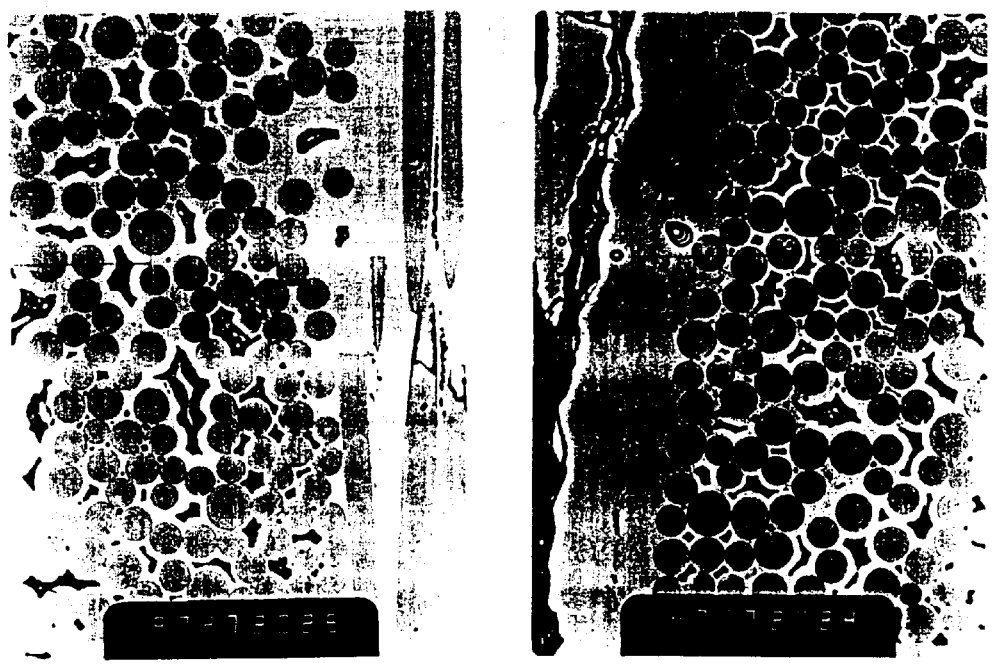
FIG. 7A is a micrograph of CMC only by the CVI treatment and FIG. 7B is a micrograph of the ceramic-based composite member of the present invention.
Figure 7B:
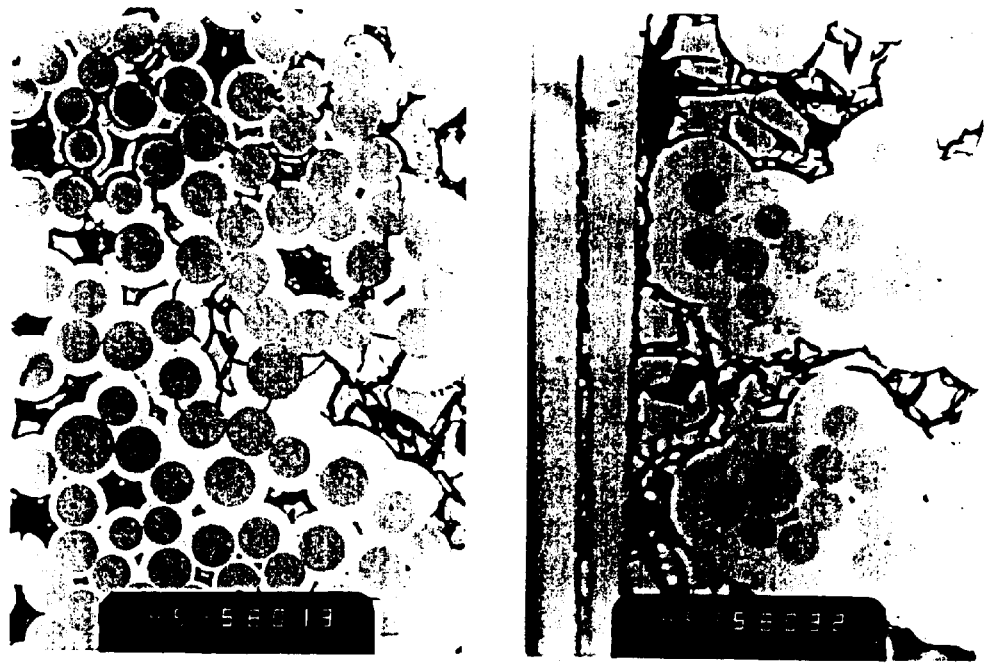

FIG. 7 shows micrographs of the CMC only by CVI treatment and the ceramic-based composite member of the present invention. In the drawing, two micrographs of FIG. 7A show CMC only by CVI treatment, i.e., CVI matrix type, while two micrographs of FIG. 7B show CMC by the hybrid treatment, i.e., the ceramic-based composite member of the present invention (hybrid matrix type).

It is seen from FIG. 7A that the dense matrix is formed around the ceramic fiber by CVI treatment. Therefore, since the binding force of the ceramic fiber is strong, Young's modulus becomes high, and follow-up properties of the matrix to fiber deformation is low. Once the thermal shock is received, cracks are extended to the fiber. It is therefore considered that the tensile strength is largely lowered.

On the other hand, it is seen from FIG. 7B that the dense matrix is formed around the ceramic fiber by CVI treatment, but there is a gap between matrices, and the gap is infiltrated/filled with the matrix by PIP treatment. Moreover, a large number of fine cracks are present in the matrix (PIP matrix). Therefore, since the binding force of the ceramic fiber by PIP matrix is weak, a kind of soft structure is formed, Young's modulus is lowered and, as a result, the thermal stress is alleviated while the resistance to thermal shock is enhanced.

In the aforementioned method (hybrid treatment) of the present invention, the dense matrix is formed around the ceramic fiber by CVI treatment, and the gap is infiltrated/filled with matrix by PIP treatment.

Consequently, the PIP treatment is faster in matrix forming rate than the CVI treatment, and can be repeated in a short time. By repeating the PIP treatment, the gaps formed after the CVI treatment can be filled to enhance the hermetic properties.

Moreover, since fine cracks are present in the matrix by PIP treatment, the binding force of the ceramic fiber is weak. Therefore, when PIP treatment is applied in addition to CVI treatment (e.g., the volume ratio of the matrix by CVI treatment in the total matrix is adjusted to about 5% or more, about 80% or less), Young's modulus can be reduced, as compared with the conventional CMC only by CVI treatment. As a result, the thermal stress is alleviated while the resistance to thermal shock is enhanced.

Furthermore, the ceramic-based composite member formed as described above comprises an SiC matrix formed on a surface of a shaped fabric, and a matrix formed in a gap of the dense matrix and having fine cracks. Since the binding force of the ceramic fiber by the matrix having fine cracks is so weak that a kind of soft structure is formed, Young's modulus is lowered, the thermal stress is alleviated and resistance to thermal shock is enhanced.

Therefore, the ceramic-based composite member and its manufacturing method of the present invention have superior advantages, for example, the hermetic properties and the resistance to thermal shock can largely be enhanced.

Additionally, some preferred embodiments of the present invention have been described, but it could be understood that the scope of the present invention is not limited to these embodiments. On the contrary, the scope of the present invention include all improvements, modifications and equivalents included in the appended claims.

What is claimed is:

1. A method of manufacturing a ceramic-based composite member, comprising the steps of:

performing a C-CVI treatment, performing a first CVI treatment to form an SiC matrix on a surface of a shaped fabric on a jig to form a ceramic-based composite member, separating the jig from the ceramic-based composite member, subsequently performing a PIP treatment to infiltrate a gap in the matrix with an organic silicon polymer as a base before performing pyrolysis and forming a dense matrix having fine cracks, and performing a second CVI treatment after the PIP treatment to form an outer dense matrix on the matrix formed by the PIP.

2. A ceramic-based composite member, made by the process comprising the steps of:

performing a C-CVI treatment;

performing a first CVI treatment to form an SiC matrix on a surface of a shaped fabric on a jig to form a ceramic-based composite member;

separating the jig from the ceramic-based composite member;

subsequently performing a PIP treatment to infiltrate a gap in the matrix with an organic silicon polymer as a base before performing pyrolysis and forming a dense matrix having fine cracks; and performing a second CVI treatment after the PIP treatment to form an outer dense matrix on the matrix formed by the PIP;

wherein said PIP treatment is performed after a volume ratio of said CVI matrix becomes between about 5% or more and about 80% or less of the total volume of the ceramic based composite member.

3. The ceramic-based composite member according to claim 2, wherein said process further comprises, before said step of performing a second CVI treatment, the step of machining.

4. The ceramic-based composite member according to claim 3, wherein said shaped fabric is formed of SiC fiber.

5. The ceramic-based composite member according to claim 4, wherein said ceramic-based composite member is a combustor.

* * * * *